US011356590B2

(12) United States Patent
Clark et al.

(10) Patent No.: US 11,356,590 B2
(45) Date of Patent: Jun. 7, 2022

(54) TOUCH INTERACTIONS WITH IMAGE CAPTURE DEVICES

(71) Applicant: Hewlett-Packard Development Company, L.P., Spring, TX (US)

(72) Inventors: Alexander Wayne Clark, Spring, TX (US); Tony Moon, Spring, TX (US); Alan Man Pan Tam, Spring, TX (US)

(73) Assignee: Hewlett-Packard Development Company, L.P., Spring, TX (US)

(*) Notice: Subject to any disclaimer, the term of this patent is extended or adjusted under 35 U.S.C. 154(b) by 51 days.

(21) Appl. No.: 16/982,187

(22) PCT Filed: Jun. 21, 2018

(86) PCT No.: PCT/US2018/038793
§ 371 (c)(1),
(2) Date: Sep. 18, 2020

(87) PCT Pub. No.: WO2019/245568
PCT Pub. Date: Dec. 26, 2019

(65) Prior Publication Data
US 2021/0127045 A1    Apr. 29, 2021

(51) Int. Cl.
*H04N 5/232* (2006.01)
*G06F 3/01* (2006.01)
*G06F 3/044* (2006.01)
*H04N 5/225* (2006.01)

(52) U.S. Cl.
CPC ............ *H04N 5/232* (2013.01); *G06F 3/017* (2013.01); *G06F 3/044* (2013.01); *H04N 5/2257* (2013.01); *G06F 2203/04112* (2013.01)

(58) Field of Classification Search
CPC ............... G06F 3/017; G06F 3/044; G06F 2203/04112; H04N 5/2257
See application file for complete search history.

(56) References Cited

U.S. PATENT DOCUMENTS

| 9,854,157 | B1 | 12/2017 | Asuncion |
| 10,136,062 | B1* | 11/2018 | Kashiyama .......... H04N 5/2351 |
| 2007/0153119 | A1 | 7/2007 | Bilbrey |
| 2015/0009282 | A1* | 1/2015 | Mai ........................ H04N 5/232 |
|  |  |  | 348/14.12 |
| 2015/0077830 | A1 | 3/2015 | Lin et al. |
| 2016/0037037 | A1* | 2/2016 | Zou ...................... H04N 5/2258 |
|  |  |  | 348/262 |
| 2016/0105598 | A1 | 4/2016 | Zeira et al. |

(Continued)

FOREIGN PATENT DOCUMENTS

| CN | 203423740 |   | 2/2014 |
| CN | 209499617 | U * | 10/2019 |

(Continued)

*Primary Examiner* — Michael Pervan
(74) *Attorney, Agent, or Firm* — HPI Patent Department

(57) ABSTRACT

Examples disclosed herein provide an image capture device. As an example, the image capture device includes an image sensor, a shutter, and a touch-enabled layer disposed above the image sensor. A controller of the image capture device is to register a user touch interaction with the touch-enabled layer and, based on a gesture detected from the user touch interaction, cycle between engaging the shutter to cover the image sensor and disengaging the shutter to expose the image sensor.

15 Claims, 4 Drawing Sheets

(56) References Cited

U.S. PATENT DOCUMENTS

| | | |
|---|---|---|
| 2016/0266418 A1 | 9/2016 | Huang |
| 2018/0004068 A1 | 1/2018 | Chen et al. |
| 2018/0338085 A1* | 11/2018 | Kashiyama .......... H04N 5/2351 |
| 2021/0382559 A1* | 12/2021 | Segev ................ G02B 27/0172 |

FOREIGN PATENT DOCUMENTS

| | | | |
|---|---|---|---|
| CN | 112902394 A | * | 6/2021 |
| DE | 102014017281 A1 | | 5/2016 |
| WO | WO-2017035650 | | 3/2017 |
| WO | 2018/043892 A1 | | 3/2018 |

* cited by examiner

TOUCH INTERACTIONS WITH IMAGE CAPTURE DEVICES

BACKGROUND

Computing devices, such as laptop computers, desktop computers, and smartphones, may include a camera (e.g., webcam). The camera may capture electronic images such as photos and/or video images. The camera may capture the electronic images responsive to an input such as an input provided by a user and/or an application, among other possibilities. The cameras may be located on an external surface of the computing device, in order to promote capture of the electronic images.

DETAILED DESCRIPTION

Privacy is a concern for users of such computing devices including cameras. For instance, control may be gained of a camera in a computing device for a variety of undesired reasons. For instance, control may be acquired of the camera included in the computing device and/or access may be gained to electronic images captured by the camera, unbeknownst to a user of the computing device. In some approaches, this may be possible because the camera may be visible and accessible to the user at all times during operation of the computing device. For example, in some approaches the camera may be mounted on an exterior portion of the computing device (e.g., on a display of the computing device), where it may be visible and accessible to the user during operation of the computing device.

Examples disclosed herein provide the ability for a user to intuitively trigger a privacy solution, for example, to cover an image sensor of an image capture device, according to an example. As an example of being intuitive, natural user interactions may cycle between engaging and disengaging the privacy solution, such as a shutter. For example, referring to the webcam on a computing device, if a user desires to engage a privacy solution to cover the image sensor of the webcam, a first gesture, such as a tap on the webcam, may engage the privacy solution. Similarly, if the user desires to later disengage the privacy solution, in order to make use of the webcam, a second gesture, such as a swipe (or long press), may disengage the privacy solution. As a result, rather than searching for the trigger that cycles between engaging and disengaging the privacy solution (e.g., a function key), the user's intuitive reaction with the webcam itself may control the privacy solution, as will be further described.

In addition, rather than relying on a trigger separate from the webcam to engage and disengage the privacy solution, by integrating the trigger with the webcam itself, for example, via the gestures, control of the privacy solution may be electrically isolated from rest of the computing device, including the operating system of the device. As a result, the triggering of the privacy solution may be removed from malicious agents, such as hackers. For example, even if the webcam is hacked, where images can be captured without knowledge of the user, as the triggering of the privacy solution is electrically isolated from the rest of the computing device, particularly the operating system, when the privacy solution is covering the image sensor of the webcam, such capture may be prevented from occurring.

Figure 1A:
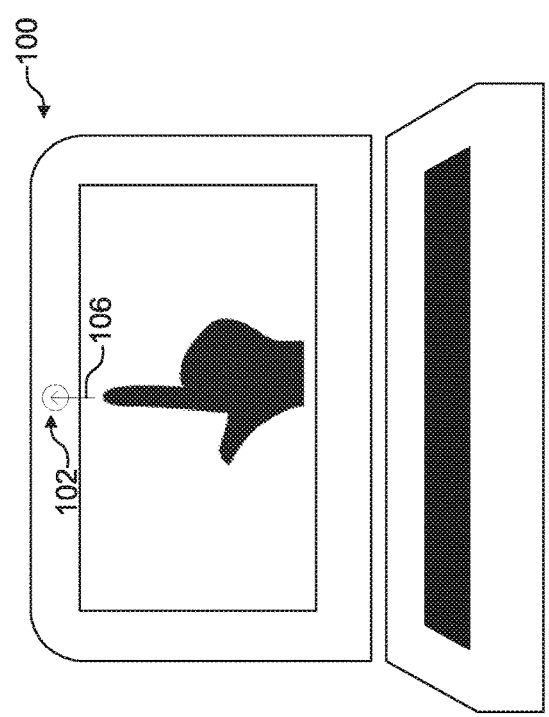
FIGS. 1A-D illustrate the use of gestures to trigger a privacy solution, to cover an image sensor of an image capture device, according to an example.
Figure 1C:
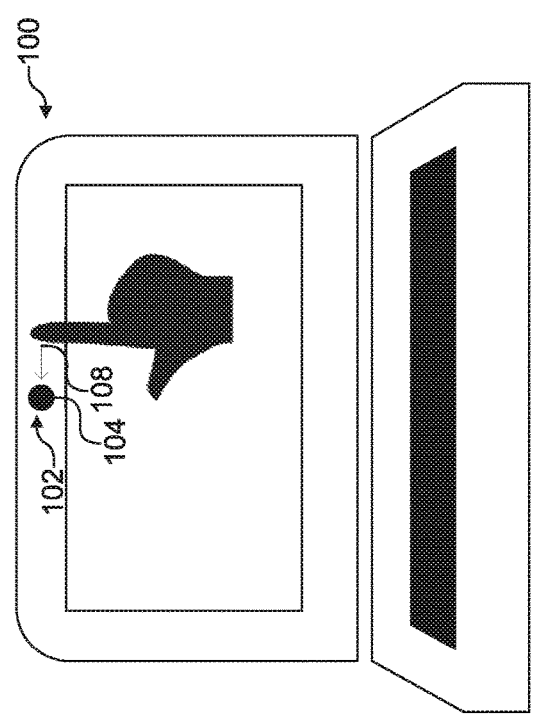
Figure 1B:
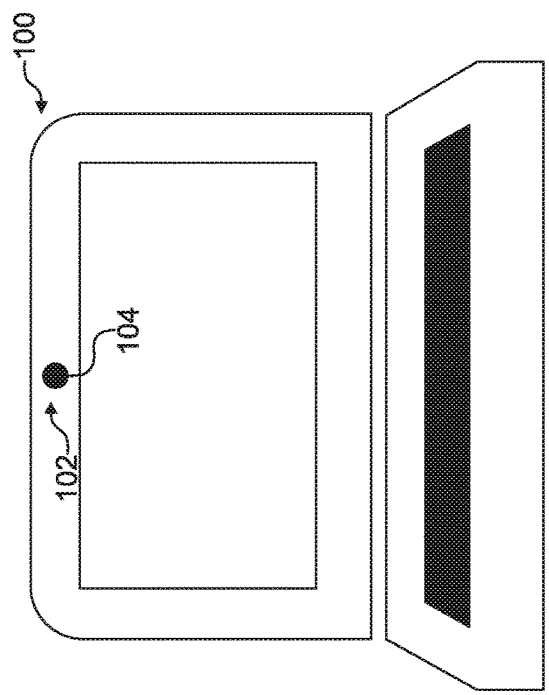

With reference to the figures, FIGS. 1A-D illustrate the use of gestures to trigger a privacy solution, such as a shutter 104, to cover the image sensor of an image capture device 102 of a computing device 100, such as the webcam, according to an example. Referring to FIG. 1A, the image sensor of the image capture device 102 is exposed, and available for use by the user of the computing device 100. However, when the user desires to engage the shutter 104 to cover the image sensor of the image capture device 102, natural user touch interactions, such as a tap on the image capture device 102, may trigger the shutter 104 to cover the image sensor of the image capture device 102. As an example of the natural touch interaction by the user, when the user desires privacy, the user may naturally use their finger to block the image capture device 102. This action, or tap of the finger by the user, may correspond to a first gesture 106 performed by the user (e.g., depicted by hand). However, gestures besides a tap may be used to engage the shutter 104 to cover the image sensor of the image capture device 102. FIG. 1B illustrates engagement of the shutter 104 to cover the image sensor of the image capture device 102, upon detection of the first gesture 106 performed by the user. The shutter 104 may be actuated by various sources, such as by a solenoid, or it may be electrically-controlled.

Figure 1D:
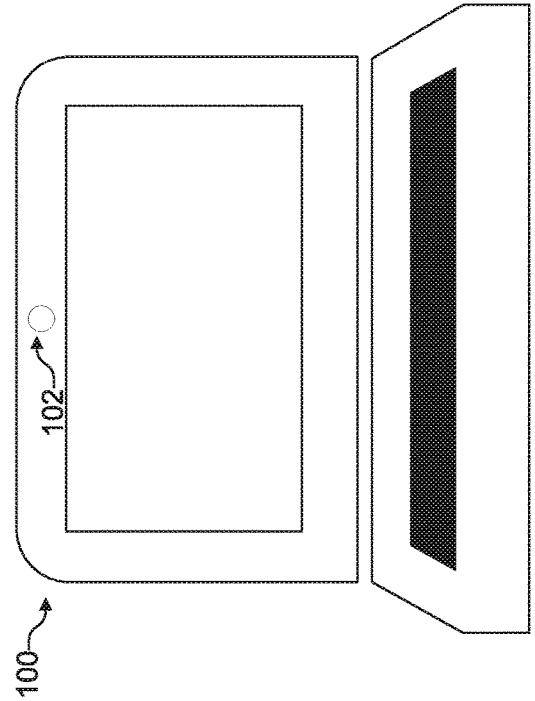

Referring to FIG. 1C, when the user desires to disengage the shutter 104, in order to expose the image sensor of the image capture device 102 for use, a second gesture 108, for example, different from the first gesture 106, may be used to disengage the shutter 104. As an example of a natural user touch interaction when a user desires to utilize the image capture device 102, a second gesture 108, such as a finger swipe, or an attempt to "slide" open or "wipe" the image capture device 102 may be registered as a trigger to disengage the shutter 104 from covering the image sensor of the image capture device 102. However, gestures besides the finger swipe may be used to disengage the shutter 104. For example, a controller utilized to detect the gestures may determine the complexity of the gesture that may be used to engage and disengage the shutter 104, as will be further described. In addition, if a gesture besides the first or second gesture is detected, the gesture may be ignored. For example, if the gesture detected is neither a tap (e.g., first gesture) nor a swipe (e.g., second gesture), the image capture device 102 may determine that the gesture is an inadvertent action performed by the user, or a false trigger to actuate the shutter 104. Although a first and second gesture is described to engage and disengage the shutter 104, respectively, the first and second gestures may be the same, where each time the gesture is performed, the shutter 104 alternates between engaging and disengaging, to switch between covering and exposing the image sensor of the image capture device 102. FIG. 1D illustrates the image sensor of the image capture device 102 made available for use by the user.

Figure 2:
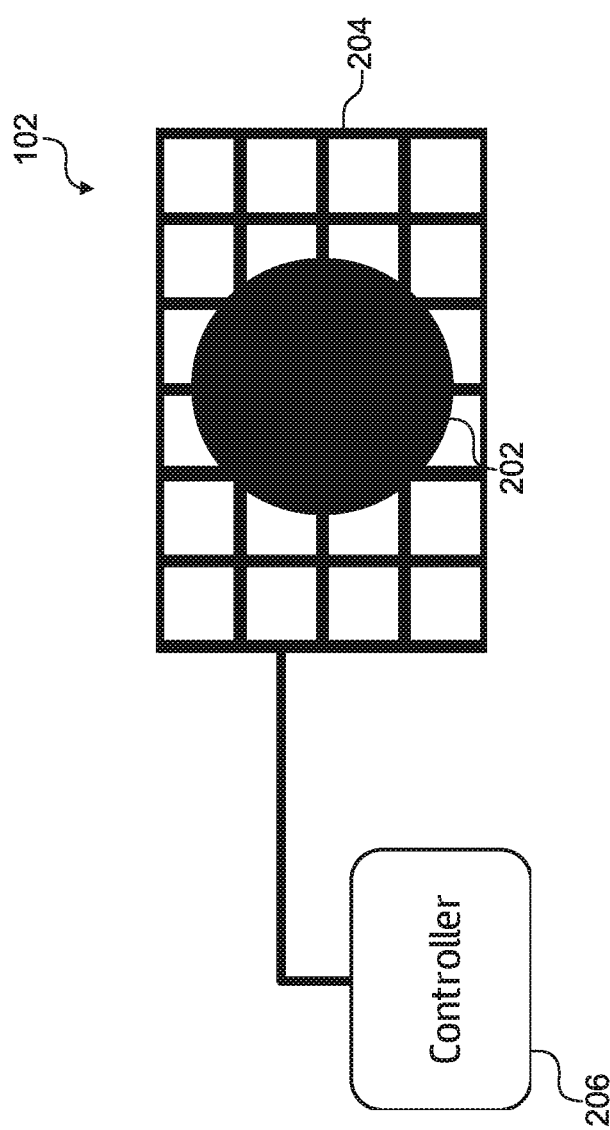
FIG. 2 illustrates the image capture device coupled to a controller for cycling between engaging and disengaging a shutter, according to an example.

FIG. 2 illustrates the image capture device 102 coupled to a controller 206 for cycling between engaging and disengaging the shutter (not shown), according to an example. As described above, the shutter (e.g., shutter 104) may be used to cover or expose an image sensor 202 of the image capture device 102, based on the gesture detected from a user touch interaction on the image capture device 102. As an example of registering user touch interactions, the image capture device 102 includes a touch-enabled layer 204 disposed above the image sensor 202 for detecting touch events on the image capture device 102. As will be further described, the controller 206 may be connected to the touch-enabled layer 204, to register user touch interactions and detect gestures, in order to control the shutter (e.g., to switch between covering and exposing the image sensor 202.

As an example, the touch-enabled layer 204 includes a capacitive mesh for detecting user touch interactions. For example, a mesh, capacitive-interlaced plastic layer may be disposed above the image sensor 202. In order for the image sensor 202 to capture images, the touch-enabled layer 204 may be a translucent plastic cover, having a capacitive mesh inside. This capacitive mesh may be connected to the controller 206 that registers the user touch interactions. The density of the capacitive mesh, illustrated in a grid-like fashion on the touch-enabled layer 204 in FIG. 2, may vary. The density of the capacitive mesh may determine a sensitivity for the controller 206 to detect the user touch interactions with the touch-enabled layer 204, and a transparency of the touch-enabled layer 204 to expose the image sensor 202. For example, enough spacing should be allowed between the metallic wires of the capacitive mesh, in order to allow the touch-enabled layer 204 to still be transparent and see-through, for images to be captured by the image sensor 202. However, the spacing between the metallic wires should be narrow enough for the controller 206 to correctly register the user touch interactions with the touch-enabled layer 204. As a result, the sensitivity of the touch-enabled layer 204 and the transparency of the touch-enabled layer 204 may be inversely proportional to each other, so a balance approach may be desirable between the sensitivity and transparency.

As mentioned above, the controller 206 may determine the complexity of the gesture that may be used to engage and disengage the shutter of the image capture device 102. For example, a first gesture, such as a tap on the image capture device 102, may engage the shutter, as described above. Similarly, if the user desires to later disengage the shutter, in order to make use of the image capture device 102, a second gesture, such as a swipe, may disengage the shutter. However, if the controller 206 lacks the complexity to differentiate between a tap and a swipe, then the differentiation, whether to engage or disengage the shutter, may be made by simply measuring the length of time that the user maintains contact with the touch-enabled layer 204. For example, when a user presses and holds its touch on the touch-enabled layer 204, the controller 206 may interpret the gesture as an indication to engage the shutter to cover the image sensor 202. Similarly, when the user performs a quick press on the touch-enabled layer 204, the controller 206 may interpret the gesture as an indication to disengage the shutter to expose the image sensor 202. As mentioned above, if a gesture besides the first or second gesture is detected, the gesture may be ignored.

As an example, the controller 206 is electrically isolated, for example, from the operating system (OS) of the computing device housing the image capture device 102. Since the controls described above are built directly into the image capture device 102, there is electrical isolation between the image capture device 102 and other components of the computing device, such as the operating system. As a result, the triggering of the shutter may be removed from malicious agents, such as hackers, providing a safe and secure environment for users of the computing device.

Figure 3:
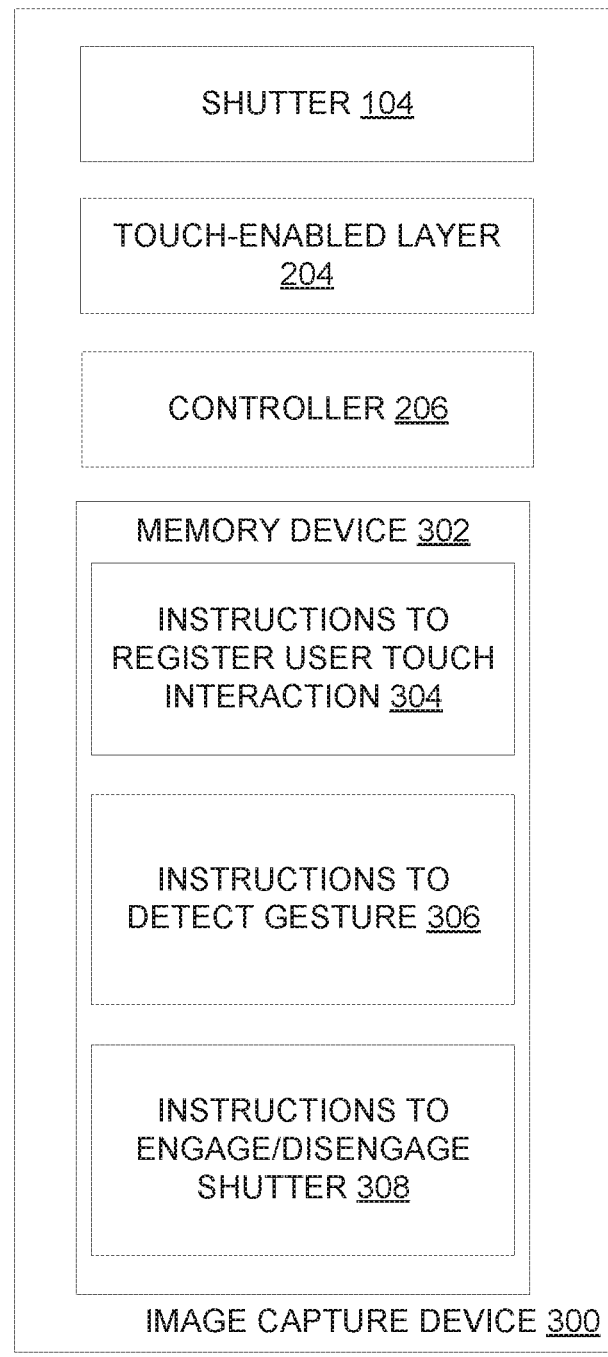
FIG. 3 illustrates an image capture device for registering user touch interactions with a touch-enabled layer to control the shutter, according to an example.

FIG. 3 illustrates an image capture device 300 for registering user touch interactions with touch-enabled layer 204 to control shutter 104, according to an example. The image capture device 300 may correspond to the image capture device 102 illustrated in FIGS. 1A-D and 2. The image capture device 300 depicts the controller 206 and a memory device 302 and, as an example of the image capture device 300 performing its operations, the memory device 302 may include instructions 304-308 that are executable by the controller 206. Thus, memory device 302 can be said to store program instructions that, when executed by controller 206, implement the components of the image capture device 300. As mentioned above, since controls are built directly into the image capture device 300, there is electrical isolation between the image capture device 300 and other components of the computing device housing the image capture device 300, such as the operating system. The executable program instructions stored in the memory device 302 include, as an example, instructions to register user touch interaction (304), instructions to detect gesture (306), and instructions to engage/disengage shutter (308).

Instructions to register user touch interaction (304) represent program instructions that when executed by the controller 206 cause the image capture device 300 to detect touch events with the touch-enabled layer 204. As described above, the touch-enabled layer 204 includes a capacitive mesh for detecting user touch interactions.

Instructions to detect gesture (306) represent program instructions that when executed by the controller 206 cause the image capture device 300 to detect gestures from the user touch interaction on the touch-enabled layer 204. As an example, the controller 206 determines the complexity of the gesture that may be used to engage and disengage the shutter 104 of the image capture device 300.

Instructions to engage/disengage shutter (308) represent program instructions that when executed by the controller 206 cause the image capture device 300 to cycle between engaging the shutter 104 to cover the image sensor and disengaging the shutter 104 to expose the image sensor, based on whether the gesture is of a first type or second type. For example, a gesture of a first type, such as a tap on the touch-enabled layer 204, may engage the shutter 104. Similarly, if the user desires to later disengage the shutter, in order to make use of the image capture device 300, a gesture of a second type, such as a swipe, may disengage the shutter. However, the gestures for engaging and disengaging the shutter 104 may vary. In addition, the first and second gestures may be the same, where each time the gesture is performed, the shutter 104 alternates between engaging and disengaging, to switch between covering and exposing the image sensor of the image capture device 300. As mentioned above, if a gesture is of a type besides the first type or the second type, the gesture may be ignored.

Memory device 302 represents generally any number of memory components capable of storing instructions that can be executed by controller 206. Memory device 302 is non-transitory in the sense that it does not encompass a transitory signal but instead is made up of at least one memory component configured to store the relevant instructions. As a result, the memory device 302 may be a non-transitory computer-readable storage medium.

Figure 4:
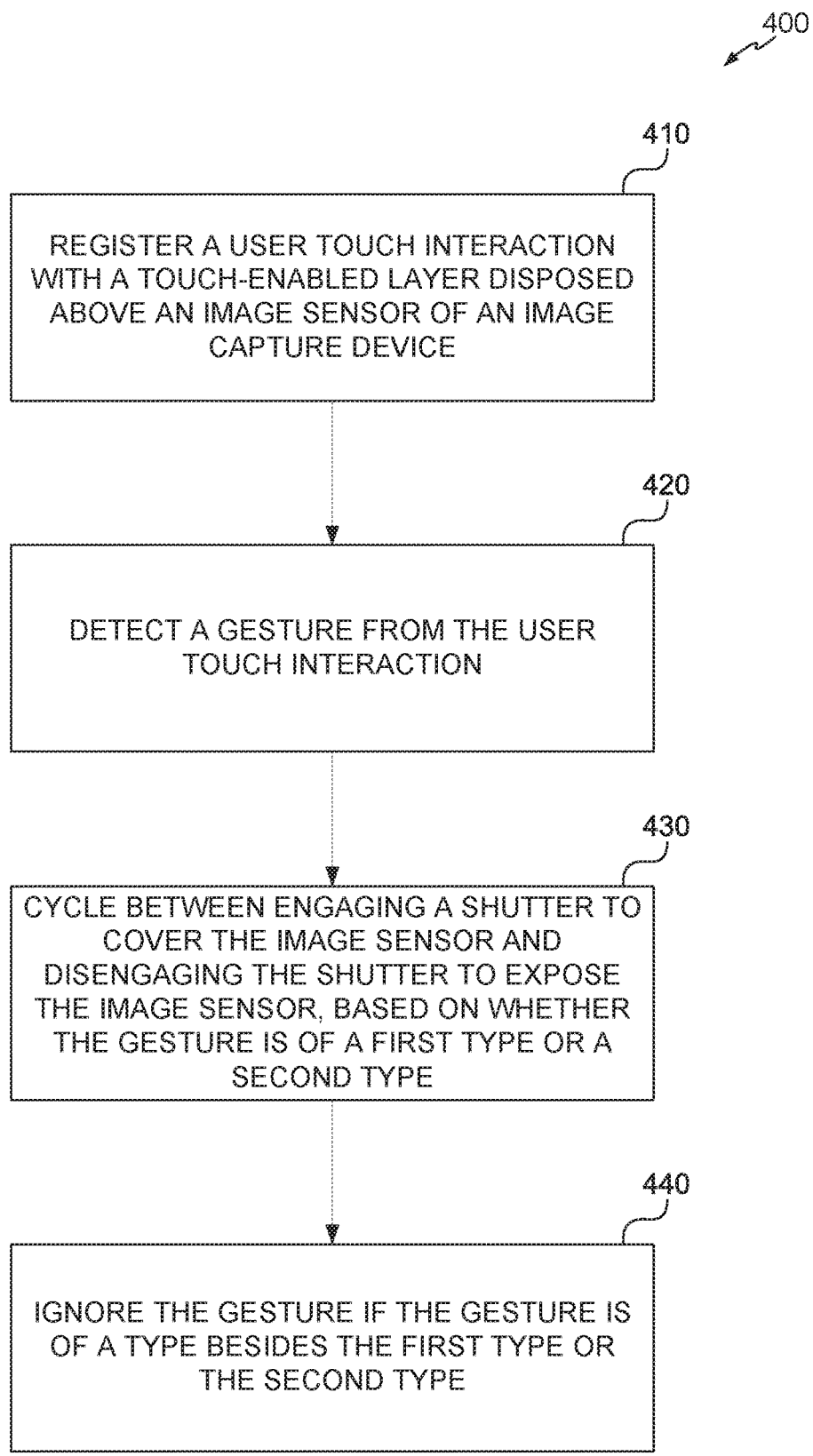
FIG. 4 is a flow diagram in accordance with an example of the present disclosure.

FIG. 4 is a flow diagram 400 of steps taken by an image capture device to implement a method for cycling between engaging and disengaging a shutter to cover and expose an image sensor of the image capture device, according to an example. Although the flow diagram of FIG. 4 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

At 410, the image capture device registers a user touch interaction with a touch-enabled layer disposed above the image sensor of the image capture device. At 420, the image capture device detects a gesture from the user touch interaction. As described above, gestures of varying degrees of complexity may be used.

At 430, the image capture device cycles between engaging the shutter to cover the image sensor and disengaging the shutter to expose the image sensor, based on whether the gesture is of a first type or a second type. As an example of being intuitive, natural user interactions may cycle between engaging and disengaging privacy solutions for the image capture device, such as the shutter. For example, referring to an image capture device on a computing device (e.g., webcam), if a user desires to engage the shutter to cover the image sensor of the image capture device, a gesture of the first type, such as a tap on the touch-enabled layer of the image capture device, may engage the shutter. Similarly, if the user desires to later disengage the shutter, in order to make use of the image capture device, a gesture of the second type, such as a swipe (or long press) on the touch-enabled layer of the image capture device, may disengage the shutter.

At 440, if the gesture if of a type besides the first type or the second type, the image capture device ignores the gesture. For example, if the gesture detected is neither a tap (e.g., gesture of a first type) nor a swipe (e.g., gesture of a second type), the image capture device may determine that the gesture is an inadvertent action performed by the user, or a false trigger to actuate the shutter.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. An image capture device comprising:
an image sensor;
a shutter;
a touch-enabled layer disposed above the image sensor; and
a controller to:
register a user touch interaction with the touch-enabled layer; and
based on a gesture detected from the user touch interaction, cycle between engaging the shutter to cover the image sensor and disengaging the shutter to expose the image sensor.

2. The image capture device of claim 1, wherein the touch-enabled layer comprises a capacitive mesh for detecting the user touch interaction.

3. The image capture device of claim 2, wherein a density of the capacitive mesh disposed within the touch-enabled layer determines:
a sensitivity for detecting the user touch interaction, and
a transparency of the touch-enabled layer to expose the image sensor, wherein the sensitivity of the touch-enabled layer and the transparency of the touch-enabled layer are inversely proportional to each other.

4. The image capture device of claim 1, wherein when the controller is to detect a first gesture from the user touch interaction, the controller is to engage the shutter to cover the image sensor.

5. The image capture device of claim 4, wherein when the controller is to detect a second gesture different from the first gesture, the controller is to disengage the shutter to expose the image sensor.

6. The image capture device of claim 1, wherein the controller is electrically isolated from an operating system (OS) of a computing device comprising the image capture device.

7. A non-transitory computer-readable storage medium comprising program instructions which, when executed by a controller of an image capture device, cause the controller to:
register a user touch interaction with a touch-enabled layer disposed above an image sensor of the image capture device;
detect a gesture from the user touch interaction; and
cycle between engaging a shutter to cover the image sensor and disengaging the shutter to expose the image sensor, based on whether the gesture is of a first type or a second type.

8. The non-transitory computer-readable storage medium of claim 7, wherein when the controller is to detect a gesture of the first type, the controller is to engage the shutter to cover the image sensor.

9. The non-transitory computer-readable storage medium of claim 7, wherein the gesture of the first type comprises a tap on the touch-enabled layer.

10. The non-transitory computer-readable storage medium of claim 7, wherein when the controller is to detect a gesture of the second type, different from the gesture of the first type, the controller is to disengage the shutter to expose the image sensor.

11. The non-transitory computer-readable storage medium of claim 7, wherein the gesture of the second type comprises a swipe along the touch-enabled layer.

12. The non-transitory computer-readable storage medium of claim 7, wherein the controller is electrically isolated from an operating system (OS) of a computing device comprising the image capture device.

13. A method comprising:
- registering a user touch interaction with a touch-enabled layer disposed above an image sensor of an image capture device;
- detecting a gesture from the user touch interaction;
- cycling between engaging a shutter to cover the image sensor and disengaging the shutter to expose the image sensor, based on whether the gesture is of a first type or a second type; and
- ignoring the gesture if the gesture is of a type besides the first type or the second type.

14. The method of claim 13, wherein, upon detecting a first gesture from the user touch interaction, engaging the shutter to cover the image sensor.

15. The method of claim 14, wherein, upon detecting a second gesture different from the first gesture, disengaging the shutter to expose the image sensor.

\* \* \* \* \*